Dec. 9, 1952  T. J. R. BRIGHT  2,620,524
WEATHER STRIP
Filed Nov. 1, 1947  2 SHEETS—SHEET 1
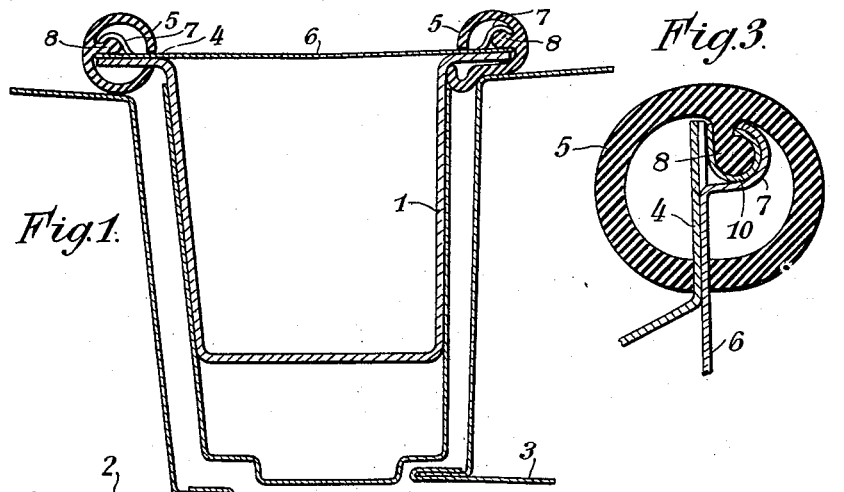
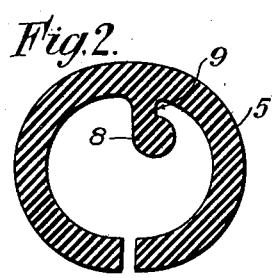
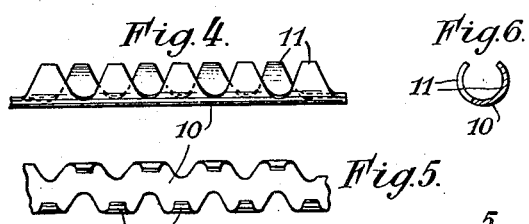
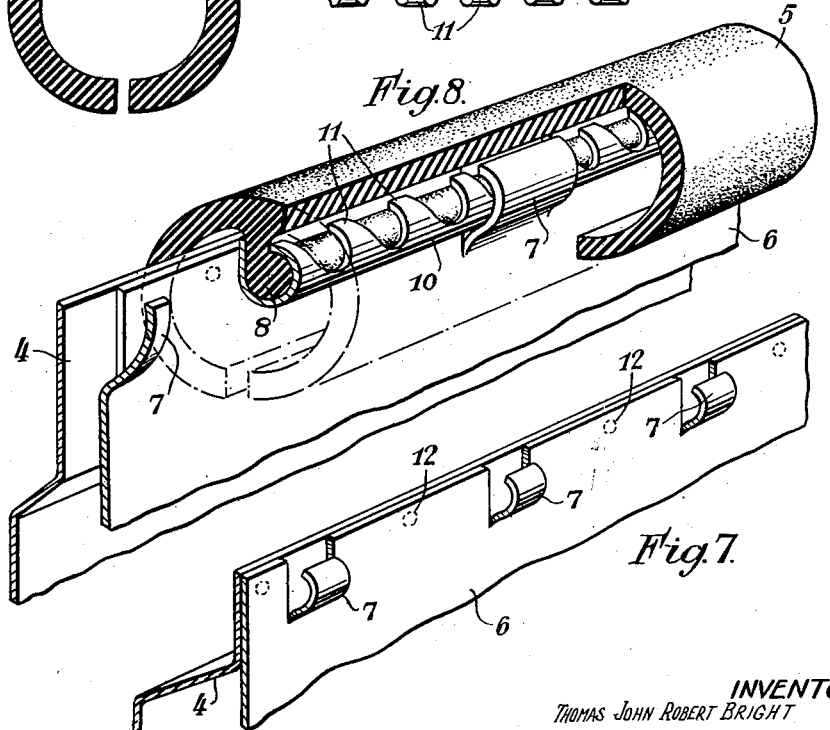
INVENTOR
THOMAS JOHN ROBERT BRIGHT
BY Otto Munk
HIS ATTORNEY Dec. 9, 1952 T. J. R. BRIGHT 2,620,524
WEATHER STRIP
Filed Nov. 1, 1947 2 SHEETS—SHEET 2
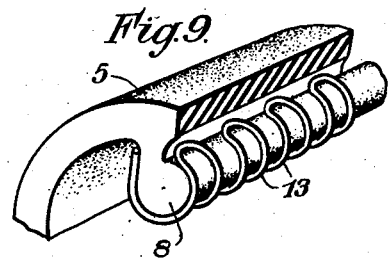
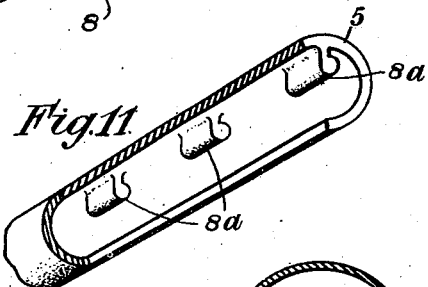
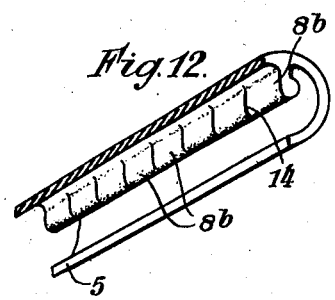
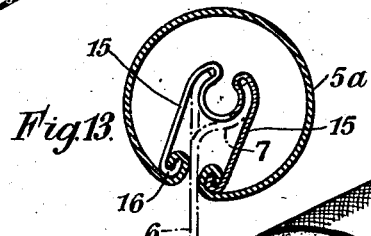
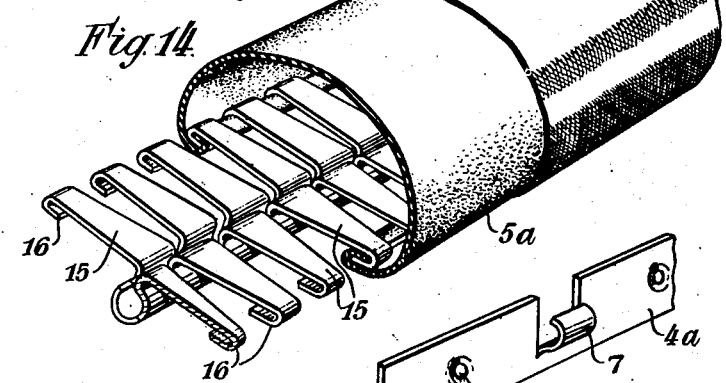
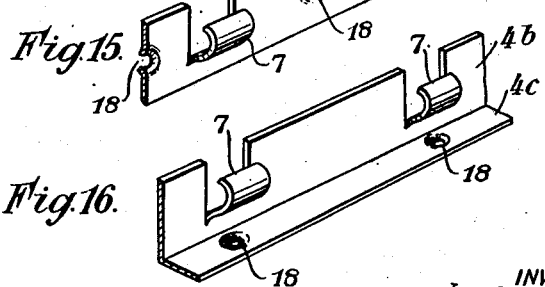
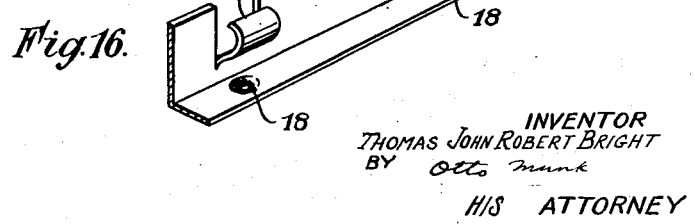
INVENTOR
THOMAS JOHN ROBERT BRIGHT
BY Otto Munk
HIS ATTORNEY Patented Dec. 9, 1952

2,620,524

UNITED STATES PATENT OFFICE 2,620,524

WEATHER STRIP

Thomas John Robert Bright, Allesley, near Coventry, England

Application November 1, 1947, Serial No. 783,546
In Great Britain February 18, 1947

4 Claims. (Cl. 20—69)

This invention relates to strips intended primarily for draught excluding purposes, but applicable for use as beadings, edgings or mouldings, such strips being suitable for use with doors, for example, the doors of houses or refrigerator doors, windows or like closure members and particularly the doors of motor and other vehicles for excluding draughts and preventing the ingress of moisture between the edges thereof and their associated fixed parts such as the door pillars or body frame members.

The present invention is not only concerned with the construction of the draught excluding strip, moulding or the like which is hereinafter referred to generally as the strip, but to a method of applying and securing the strip in position which will lend itself particularly to the production of motor vehicles in quantities, the method of attachment employed enabling the strip to be easily and quickly applied with the assistance of comparatively unskilled labour, the method dispensing with the use of the usual millboard or like attachment strip and trimming strip and the use of tacks and screws for securing in position.

Furthermore, it will be appreciated that in the case of vehicle body doors, it is necessary in many cases for the strip to pass around and conform to curves of quite small radius and consequently the strip hereinafter described and the method of attachment has been evolved with the object of preventing any kinking or noticeable unevenness of the strip where it passes around small radius curves. In addition the simple method of attachment is, in the case of a motor vehicle door, preferably associated with a projecting flange on the door pillar or other fixed part, the flange being capable of being readily bent, if necessary, in the case of a badly fitting door to ensure a good seal being obtained, the flange forming a fixed abutment between which abutment and the door the strip is sandwiched to ensure a good seal.

The strip in accordance with the present invention has an internally arranged inwardly directed attachment portion by means of which attachment portion the strip can be secured to a flange or other member provided for its reception.

It is proposed to construct the strip wholly or partly of natural rubber, synthetic rubber or from a textile material, or alternatively, from a plastic material such as polyvinyl chloride, and to either leave the strip bare or cover it wholly or in part with a woven or other covering or by a layer of flock or other material which can be applied to the strip by blowing it thereon in known manner.

The strip, if left bare, can be fluted or otherwise marked or coloured to give it an ornamental appearance and to suit the colouring of the car or other structure with which it is to be used.

It is preferred to form the attachment portion as an integral bead-like part of the strip, but it is within the scope of the invention to construct the attachment portion separately and from metal. Furthermore, it is preferred that the strip shall be of hollow formation and in the form of a broken tube, the bead-like attachment portion projecting substantially radially inwardly from the walls thereof, the walls of the tube being slit longitudinally to produce the desired broken tubular formation, the particular section being produced by means of an extruding or moulding process. It is, however, within the scope of the invention to make the strip of a more or less solid construction, providing in the case of a strip intended for draught excluding purposes, the strip possesses the necessary resilience to fulfill its function of forming a draught-proof seal.

The preferred method of attachment makes use of a series of spaced clips which are adapted to embrace partially and grip the inwardly directed bead-like attachment portion of the strip, the clips being either so formed that the bead can be sprung into position therein or alternatively so shaped that they will receive the bead and can subsequently be bent with the aid of a special tool to grip the bead firmly, and thereby secure the strip in position upon the component with which it is to be associated.

In order that the invention may be clearly understood and readily carried into effect the invention is hereinafter described with reference to the accompanying drawings, in which:

Figure 1 is a fragmentary sectional plan view of a car body door pillar and its associated doors, the pillar being fitted with two strips constructed in accordance with the invention;

Figure 2 is a cross section of the strip drawn to an enlarged scale;

Figure 3 is a cross section drawn to an enlarged scale illustrating a preferred method of securing the strip in position;

Figures 4, 5 and 6 are respectively, a side elevation, a plan view and sectional end elevation of a metal bead reinforcing member;

Figure 7 is a perspective view illustrating a part of a supporting member having integrally formed spaced clips for the attachment of the strip thereto;

Figure 8 is a fragmentary perspective view partly in section illustrating the preferred method of attachment;

Figure 9 is a fragmentary perspective view partly in section illustrating a modified construction;

Figure 10 is a side elevation of the wire bead reinforcing member shown in Figure 9;

Figures 11 and 12 illustrate two alternative forms of strip;

Figure 13 is a cross section illustrating a still further form of strip and its method of attachment;

Figure 14 is a perspective view partly in section illustrating this modified strip in its initial form, prior to being bent to a substantially circular shape;

Figures 15 and 16 illustrate two alternative forms of supporting flanges intended for use with any of the strips hereinbefore shown.

In the arrangement shown in Figure 1 which illustrates the application of strips in accordance with the invention to a door pillar 1 of a motor vehicle body, the left hand door 2 is shown partly closed, whilst the right hand door 3 is shown in its fully closed position. The door pillar 1 is formed with outwardly directed pressed-out flanges 4 which serve to support the two draught excluder strips 5 in position, the arrangement being such that each strip will, when the door is closed, be partly compressed between the flange and the adjacent door surface as shown on the right hand side of Figure 1, thereby providing a draught and moisture-proof seal. The door pillar is fitted with a metal plate 6 which is formed at its edges with a series of spaced pressed-out clips or tangs 7 which are used to secure the strips firmly in position at spaced points, the cross sectional forms of the clips when the strips are in position being shown clearly in Figure 3. Alternatively, the clips may be formed separately and secured to the flange or other support by a welding or other process. To enable the strips to be gripped by clips 7 each strip which is of the broken tubular formation shown in Figure 2 is formed with an integral inwardly directed bead-like attachment portion 8 having a bulbous inner end, the clip being so formed that it embraces the bulbous part over more than half its peripheral surface and fits snugly into the angle between the neck-like portion 9 of the bead and the adjacent wall of the broken tubular strip constituting the effective portion.

It is preferred that each strip shall be produced by an extrusion or moulding operation from natural rubber, synthetic rubber or other mouldable composition having the requisite resiliency and the clips may either engage the bead-like attachment portion 8 directly as shown in Figure 1 or alternatively, and preferably, the bead-like attachment portion may carry a sheet metal reinforcing member 10 such as is shown in Figures 4, 5 and 6 and is shown applied to the bead-like attachment portion in Figures 3 and 8. This reinforcing member 10 which may conveniently be stamped from strip or sheet metal is provided with a series of staggered tongue portions 11, the reinforcing member being bent into part circular cross sectional shape as shown in Figure 6 around the bead-like attachment portion so that it is secured firmly in position thereon the tongue portions providing virtually a continuous support for the bead on its opposite sides and fitting closely into the angle between the bead and the strip walls.

The reinforcing member in addition to having the advantage of preventing any kinking or apparent unevenness in the strip resulting from the latter being bent around a small radius curve has the advantage of providing a better connection between the clips and the bead-like attachment portion and prevents the bead from being damaged in fitting.

As shown clearly in Figure 2 it is preferred that the bead-like attachment portion shall be slightly offset from the diameter of the strip and the longitudinal slit in the tubular strip shall preferably lie substantially diametrally. It will be appreciated, therefore, that the left hand side of the strip shown in Figure 2, will, when in position on the door pillar, be compressed under the closing action of the door, whilst that part of the strip on the opposite side of its diameter will provide a cover for the clips and being situated within the motor vehicle may be coloured, marked or otherwise given an ornamental appearance to suit the upholstery or internal decoration of the vehicle. Furthermore, the spaced clips may be so formed that the bead-like attachment portion of the strip can be sprung into position within the clips, the clips gripping the attachment portion in a resilient manner, or alternatively, the clips may be so shaped that the bead-like attachment portion can be easily placed in position therein, the clips being then bent with the aid of a special tool so that they assume the more or less curved cross sectional shape shown in Figure 3 and embrace the bead-like attachment portion over a little more than half its peripheral surface, thereby maintaining the strip firmly in position.

As shown in Figures 7 and 8 the metal plate 6 from which the attachment clips are pressed may be secured to the flanges by spot welding as at 12, or may be secured thereto in any other suitable manner. Alternatively, the clips may be pressed out of the flanges themselves in cases where the metal plate 6 can be dispensed with.

Figures 9 and 10 illustrate a modified form of bead reinforcing member, the reinforcing member 13 in this case being bent up from steel or other wire into substantially zig-zag formation and sprung or otherwise applied to the bead-like attachment portion.

Figure 11 illustrates a modified form of strip in which the bead-like attachment portion instead of extending throughout the full length of the strip is castellated thereby providing a series of spaced bead-like attachment members 8a of comparatively short length.

With this arrangement the strip may be applied to spaced clips simply by springing the bead-like attachment portions into engagement with their respective clips in succession, the clips being, of course, appropriately spaced to receive the parts 8a.

In Figure 12 the bead-like attachment portion extends throughout the full length of the strip, but in this case the bead-like attachment portion is slit as at 14 at spaced intervals to provide a series of adjacent attachment portions 8b which can be inserted in the appropriate clips on the flange or other supporting member successively, this arrangement obviating the necessity for the clips and attachment portions being exactly the same distance apart and giving the strip increased stiffness in a longitudinal direction.

Instead of producing the strip initially of tubular form the latter may be produced from flat or substantially flat strip rubber or similar resilient material and Figures 13 and 14 illustrate such a method of construction. In this case the strip 5a is initially flat or substantially flat and is associated with a sheet metal bead-like attachment portion, the general shape of which is shown clearly in Figure 14, the attachment portion being produced with a series of outwardly directed staggered fingers 15, the extremities 16 of which are bent to grip the marginal edges of the rubber or other strip 5a. The metal attachment portion is bent at its centre to part tubular form to provide the desired bulbous shape and the fingers are finally bent into the form shown in Figure 13 to convert the hitherto arcuate shaped member 5a into substantially circular form. It will be appreciated that in this way a strip is produced having substantially the same properties as the strip shown in Figure 2, the metal bead-like attachment portion being sprung or otherwise secured in position within the spaced clips 7 on the flange or other supporting member so that the two halves of the part 5a lie on opposite sides of the point of attachment. The part 5a, as in the case of the rubber or other strip previously described and illustrated, may be covered with a woven or other covering material 17 or may have a coating of flock or other material applied thereto by a blowing or other process, for the purpose of giving the strip an ornamental appearance.

It will be appreciated that in the case of Figures 13 and 14 the staggered disposition of the fingers 15 will enable the metal attachment member to be bent around curves of quite small radius without kinking of the strip occurring.

Referring to Figues 15 and 16 which illustrate two alternative forms of flange for carrying draught excluder strip intended particularly for household purposes, where it is desired to apply the draught excluder strip to a household door or window, the flange 4a in the case of Figure 15 is in the form of a simple metal strip having integrally formed spaced pressed-out clips 7 and provided with countersunk holes 18 for its attachment to the edge of a door or window. In the case of Figure 16 the flange 4b is bent at right angles to provide a part 4c formed with countersunk holes 18 for its attachment to the floor. In both arrangements the clips 7 will be bent to embrace partially the bead-like attachment portion of the srtip and in the case of Figure 15 assuming that the flange 4a is screwed to the edge of a door, the projecting part of the strip will, when the door is closed, contact the adjacent face of the door jamb and provide a draught-proof seal.

In the case of Figure 16 the flange will be secured to the floor and the strip lying close to the door will be compressed under the closing action of the door to produce the desired sealing effect.

The strip disclosed by Figure 2 may, if desired, be longitudinally stiffened by the insertion of a comparatively hard core in the bulbous part of the bead-like attachment portion, as, for example, a wire member. Alternatively, the bead-like attachment portion may be given increased stiffness and rigidity by vulcanizing the bead-like attachment portion to a higher degree than the rest of the strip and in such a case it may be preferred to dispense with any form of metal bead reinforcing member such as is shown in Figures 4 to 6 and Figures 9 and 10.

It will be appreciated from the foregoing description that with any of the arrangements hereinbefore described the strip can readily be applied with the assistance of comparatively unskilled labour and that when in position it will closely conform to the curved or other formation of the supporting member, thus providing a good seal between the co-operating parts and harmonising with the decorative appearance of the motor vehicle or other structure to which it is applied.

What I claim is:

1. A resilient sealing device for door edges and the like, including a supporting flange, partly arcuate clips carried thereby and a substantially tubular resilient member partly enclosing said flange, said tubular member being formed with an internally-arranged bead-like attachment portion having a radius of curvature of the same order of magnitude as the arcuate portion of said clips, whereby said clips can be located concentrically with and partly surrounding said attachment portion, said tubular member being so formed that a portion thereof other than said attachment portion is pressed between said door and said flange upon closing of said door.

2. A resilient sealing device according to claim 1, in which said tubular member is also provided with a longitudinally-extending inwardly-directed opening, permitting the introduction of said flange into the interior of said tubular member.

3. A device according to claim 1, in which said bead-like attachment portion also bears, substantially covering the external surface thereof, a reinforcement of stronger material than that constituting the resilient tubular member.

4. A device according to claim 3, in which said reinforcement is formed of metal.

THOMAS JOHN ROBERT BRIGHT.

REFERENCES CITED

The following references are of record in the file of this patent:

UNITED STATES PATENTS

| Number | Name | Date |
|---|---|---|
| 1,877,729 | Chaffee | Sept. 13, 1932 |
| 1,936,113 | Jelliffe | Nov. 21, 1933 |
| 2,102,393 | Tea | Dec. 14, 1937 |
| 2,149,742 | Miller | Mar. 7, 1939 |
| 2,329,688 | Bedford | Sept. 21, 1946 |

FOREIGN PATENTS

| Number | Country | Date |
|---|---|---|
| 102,938 | Australia | 1938 |
| 403,569 | Great Britain | Dec. 28, 1933 |
| 441,948 | Great Britain | 1936 |